United States Patent [19]
Soubaras

[11] Patent Number: 5,583,826
[45] Date of Patent: Dec. 10, 1996

[54] METHOD OF PROCESSING SIGNALS FOR GEOPHYSICAL PROSPECTING, THE METHOD MAKING USE OF AN IMPROVED WAVE FIELD EXTRAPOLATION OPERATOR

[75] Inventor: Robert Soubaras, Orsay, France

[73] Assignee: Compagnie Generale de Geophysique, France

[21] Appl. No.: 68,635

[22] Filed: May 27, 1993

[30] Foreign Application Priority Data

May 29, 1992 [FR] France .................................. 92 06564

[51] Int. Cl.$^6$ .............................. G01V 1/28; G01V 1/40; H03H 17/00
[52] U.S. Cl. .......................... 367/44; 367/49; 364/413.18; 364/421
[58] Field of Search .................................. 367/43, 44, 49; 364/413.18, 421, 422; 382/17, 41

[56] References Cited

U.S. PATENT DOCUMENTS

| | | | |
|---|---|---|---|
| 3,622,965 | 11/1971 | Wu | 367/43 |
| 4,104,608 | 8/1978 | Melling et al. | 367/15 |
| 4,513,376 | 4/1985 | Barber | 364/422 |
| 4,575,261 | 3/1986 | Berger et al. | 364/422 |
| 4,673,941 | 6/1987 | Mark | 367/100 |
| 4,797,821 | 1/1989 | Petak et al. | 364/422 |
| 4,799,157 | 1/1989 | Kucuk et al. | 364/422 |
| 4,982,382 | 1/1991 | Dablain | 367/73 |
| 5,206,836 | 4/1993 | Holzhausen et al. | 367/35 |

OTHER PUBLICATIONS

Geophysical Prospecting, vol. 37, No. 8, Nov. 1989, pp. 926, line 40 & 937, line 10.

Geophysics, vol. 56, No. 11, Nov. 1991, Tulsa, USA pp. 1770–1777.

Geophysics, vol. 56, No. 11, Nov. 1991, Tulsa, USA, pp. 1778–1785.

Proceedings 7th Annual Princeton Conference on Information Science and Systems, 1973, Princeton, USA, pp. 247–251.

Geophysics, vol. 37, No. 4, Aug. 1972, Tulsa, USA, pp. 573–583.

IEEE Acoustics, Speech, and Signal Processing Magazine, vol. 36, No. 2, Feb. 1988, New York, USA, pp. 252–264.

ICASSP 88: Multidimensional Processing, vol. II, Apr. 11, 1988, New York, NY, USA, pp. 894–897.

Esmersoy et al, Geophysics, vol. 53, #7, pp. 920–931, Jul. 1988; abst. only provided herewith.

Zayezdny et al, Signal Process., vol. 22, #2, pp. 153–178, Feb. 1991; abst. only herewith.

*Primary Examiner*—Nelson Moskowitz
*Attorney, Agent, or Firm*—Blakely, Sokoloff, Taylor & Zafman

[57] ABSTRACT

The present invention relates to a method of extrapolating a set of traces recorded by means of an array of sensors, in the context of a geophysical prospecting process, the method comprising the steps consisting in: i) approximating a minus Laplacian $L_0(k_x,k_y)=k_x^2+k_y^2$ by the sum of two one-dimensional filters; and ii) approximating an extrapolation operator $F_0$ by a polynomial of the minus Laplacian $L_0$. The invention also provides a system for geophysical prospecting.

36 Claims, 6 Drawing Sheets

3D IMPULSE RESPONSE
17 TERM LAPLACIAN
HORIZONTAL SLICE Z=450m

FIG_1

REAL PART OF THE EXTRAPOLATION FILTER

FIG. 2a

MAXIMUM MODULUS

FIG. 2b

IMAGINARY PART OF THE EXTRAPOLATION FILTER

FIG.2c

MODULUS OF THE EXTRAPOLATION FILTER

FIG.2d

FIG_3

2D IMPULSE RESPONSE

FIG_4

3D IMPULSE RESPONSE
17 TERM LAPLACIAN
VERTICAL SLICE Y=0

FIG. 5

3D IMPULSE RESPONSE
17 TERM LAPLACIAN
HORIZONTAL SLICE Z=450m

FIG_6

3D IMPULSE RESPONSE
17 TERM McCLELLAN TRANSFORM
HORIZONTAL SLICE Z=450m (PRIOR ART)

METHOD OF PROCESSING SIGNALS FOR GEOPHYSICAL PROSPECTING, THE METHOD MAKING USE OF AN IMPROVED WAVE FIELD EXTRAPOLATION OPERATOR

FIELD OF THE INVENTION

The present invention relates to the field of seismic or geophysical prospecting.

GENERAL STATE OF THE ART

It is known that seismic or geophysical prospecting for the purpose of studying the internal structure of the earth frequently consists in recording seismic waves coming from an artificial source (explosive, vibration generator, etc. . . . ) after the waves have been reflected and/or refracted underground.

This method of prospecting is based on the property of the soundwaves caused by an artificial source whereby they are subjected to refraction and reflection at the contact surfaces between strata that have different densities and transmission velocities, in application of laws analogous to the laws of optics.

Thus, the systems used for geophysical prospecting generally comprise: an artificial source of a soundwave or a shockwave that stems from an explosive or the equivalent; an array of sensors such as geophones or the equivalent, disposed on the surface of the ground and responsive to the waves reflected upwards by the internal strata of the ground; a recorder connected to said sensors to record in the form of seismograms the electrical signals they provide; means for processing the recorded signals; and display means for displaying a usable result after said signals have been processed.

The processor means must perform quite complex processing on the recorded signals since the signals cannot be used directly for displaying the characteristics of the analyzed strata underground since the signals are disturbed.

The disturbances in such signals are quite well known to the person skilled in the art. They result, in particular, from the fact that each point at which acoustic impedance changes redirects incident soundwaves in a plurality of directions, thereby giving rise not to a single point in the recording but to a hyperbolic trace since each diffracting point is situated at a different distance from the various sensors used.

To eliminate this disturbance, it is general practice to use a "migration" technique which focuses the diffractive energy and which enables a clear image of the underground formations to be obtained, considering them as constituting a set of secondary sources. Numerous migration techniques are presently in use. Amongst the various techniques known in this way, the present invention relates more particularly to the category of recursive methods based on extrapolation in depth (z) of a wave field recorded on the surface (z=0). Within this category, the methods most commonly used operate in the domain of time frequency ($\omega$) and of space which is either (x,z) when two dimensions (2D) are under consideration or else (x,y z) when three dimensions (3D) are under consideration. It is also possible to distinguish implicit extrapolation methods in which the extrapolated field is obtained by solving a system of linear equations, and explicit methods in which the extrapolated field is obtained by applying a space convolution operator $F_0(\omega,c,x,y)$ applying the following equation:

$$W_{\omega,z+dz}(x,y) = F_0(\omega,c,x,y) * W_{\omega,z}(x,y) \tag{1}$$

in which the * denotes convolution in (x,y).

$W_{\omega,z}(x,y)$ is obtained from $W_{t,z}(x,y)$ which is the wave field at depth $z$ by means of a Fourier transform on the variable $t$. The extrapolation operator $F_0(\omega,c,x,y)$ depends on $c$ which is the local wave propagation velocity in the medium.

The above equation makes it possible to calculate the wave field $W_{\omega,z}(x,y)$ in recursive manner for all depths $z$ on the basis of surface recordings at depth z=0, which provides $W_{\omega,z=0}(x,y)$.

Implicit methods have the advantage of being unconditionally stable, but they lead to numerical inaccuracies that increase with the dip of the geological reflectors. The "dip" corresponds to the inclination of the sensitive surfaces of the sensors relative to the horizontal, i.e. to the propagation angle relative to the vertical. In addition, implicit methods are difficult to generalize to the 3D case in which it is necessary to make use of an anisotropic approximation known as "splitting" which consists in splitting up the extrapolation into two 2D steps in the directions $x$ and $y$. This gives rise to a poor image of reflectors for which dip is neither in the direction $x$ nor in the direction $y$.

Explicit methods have the advantage of being easy to generalize to the 3D case. However, it is difficult to calculate the coefficients of the convolution operators which guarantee stability and accuracy. In general, the operators are implemented by being calculated in advance in a table as a function of samples of underground velocity parameters.

NOTATION USED

In practice, data dependent on (x,y) is known only over a discrete grid of values corresponding on the surface to the positions of the sensors. The $x$ and $y$ sampling intervals are written Dx and Dy. ($\omega,k_x,k_y$)=(frequency, x wave number, y wave number) are variables that correspond to t,x,y via the Fourier transform. $k_{nyqx}=\pi/Dx$ denotes the Nyquist wave number for the sampling interval Dx, and $k_{nyqy}=\pi/Dy$ has the same meaning for the sampling interval Dy. The wave field is designated below by $W_{\omega,z}(m_x,m_y)$, where $m_x$ is the index on the x-axis and $m_y$ is the index on the y-axis, $W_{\omega,z}(m_x,m_y)$ designates the (x,y) sampled field over a grid of mesh size Dx in the x-coordinate direction and of mesh size Dy in the y-coordinate direction. The indices $(m_x,m_y)$ thus correspond to coordinates $(m_xDx,m_yDy)$. The propagation velocity field at depth $z$ is written $c_z(m_x,m_y)$.

The extrapolation operator $F_0(\omega,c,x,y)$ for a field of upgoing waves at a depth Dz, a propagation velocity $c$ and a frequency $\omega$, is written as follows in the $(k_x,k_y)$ domain:

$$F_0(\omega,c,k_x,k_y) = \exp jDz(\omega^2/c^2 - k_x^2 - k_y^2)^{1/2} \tag{2}$$

Equation (1) can be written as follows in the $(k_x,k_y)$ domain:

$$W_{\omega,z+dz}(k_x,k_y) = F_0(\omega,c,k_x,k_y) W_{\omega,z}(k_x,k_y) \tag{3}$$

To apply the methods to waves propagating downwardly, it suffices to take the conjugate of $F_0$.

Methods of explicit extrapolation in depth are based on the fact that $F_0$ does not depend on $\omega$ and on $c$ separately, but only on the ratio $\omega/c$. It is therefore possible to write $F_0(\omega,c,k_x,k_y)=F_0(\omega/c,k_x,k_y)$.

STATE OF THE ART IN THE FIELD OF 2D EXTRAPOLATION

When using two-dimension extrapolation, the extrapolation operator is written:

$$F_0(\omega/c, k) = \exp jDz(\omega^2/c^2 - k^2)^{1/2}$$

Explicit methods consist in performing the spectral synthesis of $F_0$, i.e. in calculating a bank of coefficients $a(\omega/c, n)$ for $\omega/c$ running over sampling in the interval $[\omega_{min}/c_{max}, \omega_{max}/c_{min}]$, where $[\omega_{min}, \omega_{max}]$ represents the frequency content of the data and $[c_{min}, c_{max}]$ represents the limiting propagation velocities, and $n \in [0, N]$, such that the synthesized operator:

$$F(\omega/c, k) = \sum_{n=0}^{n=N} a(\omega/c, n) \cos(nDx\, k)$$

approximate to $F_0(\omega/c, k)$ for $k \in [0, k_c = \omega \sin\theta/c]$, passband, and is of modulus less than one for $k \in [k_c, k_{nyq} = \pi/Dx]$, stopband. $\theta$ designates the maximum geological dip corresponding to precise propagation. $k_c = \omega \sin\theta/c$ is the wavenumber corresponding to given $\omega/c$ and to a propagation angle $\theta$ relative to the vertical. The constraint on the modulus is made necessary by the fact that since the operators are intended for recursive application, a modulus of more than one would give rise to instability.

It is therefore necessary to ensure accuracy on the passband and stability on the stopband.

Holberg [1] uses a conventional method of non-linear least squares to do this. That method nevertheless gives rise to a high calculation cost.

Hale [2] proposes a method that is faster by computing the coefficients a(n) that equalize the first coefficients of the Taylor series of $F(k)$ and $F_0(k)$ in $\underline{k}$. Stability is ensures by forcing $F(k)$ to be zero at certain values of $\underline{k}$ in the stopband. Nevertheless, since a truncated Taylor series is a good approximation only for small values of $\underline{k}$ only, and thus for small values of dip $\theta$, that method is not optimum.

STATE OF THE ART IN THE FIELD OF 3D EXTRAPOLATION

In three dimensions, the extrapolation operator of depth Dz for an upgoing wave field, a propagation velocity $\underline{c}$ and a frequency $\omega$ is:

$$F_0(\omega/c, k_x, k_y) = \exp jDz(\omega^2/c^2 - k_x^2 - k_y^2)^{1/2}$$

In reference [3] Blaquière proposes performing explicit 3D extrapolation by generalizing the 2D case, i.e. by performing 2D spectrum synthesis: a bank of coefficients $a(\omega/c, n_x, n_y)$ is calculated for $\omega/c$ running over samples in the range $[\omega_{min}/c_{max}, \omega_{max}/c_{min}]$ in which $[\omega_{min}, \omega_{max}]$ represents the frequency content of the data and $[c_{min}, c_{max}]$ represents the propagation velocity limits; and $n_x \in [-N_x, N_x]$, $n_y \in [-N_y, N_y]$ such that $F(\omega/c, k_x, k_y)$ as defined below:

$$F(\omega/c, k_x, k_y) = \sum_{n_x=-N_x}^{n_x=N_x} \sum_{n_y=-N_y}^{n_y=N_y} a(\omega/c, n_x, n_y) \exp[j(n_x Dx k_x + n_y Dy k_y)]$$

approximates to $F_0(\omega/c, k_x, k_y)$ over the disk $(k_x^2 + k_y^2)^{1/2} \leq \omega \sin\theta/c$ and is of modulus less than one, elsewhere. $\theta$ is the maximum geological dip which corresponds to an accurate extrapolation. This parameter is selected by the user.

The $a(\omega/c, n_x, n_y)$ are applied as follows:

$$W_{\omega, z+dz}(m_x, m_y) = \sum_{n_x=-N_x}^{n_x=N_x} \sum_{n_y=-N_y}^{n_y=N_y} a[\omega/c_{z+dz}(m_x, m_y), n_x, n_y]\, W_{\omega, z}(m_x - n_x, m_y - n_y)$$

which is the version in $(m_x, m_y)$ of the equation:

$$W_{\omega, z+dz}(k_x, k_y) = F(\omega/c, k_x, k_y) W_{\omega, z}(k_x, k_y)$$

In reference [4] Hale takes up the idea of the above tabulation and also takes advantage of the circular symmetry in $(k_x, k_y)$ of $F_0(\omega/c, k_x, k_y)$. To do this he used the one-dimensional coefficient of $a(\omega/c, n)$ which corresponds to a 2D extrapolation together with the transformation process proposed by McClellan in reference [5]. With Dx=Dy, Hale writes:

$$F_0(\omega/c, k_x, k_y) = \exp jDz(\omega^2/c^2 - k^2)^{1/2}$$

with $k = (k_x^2\, k_y^2)^{1/2}$
and performs the following spectrum synthesis $$F(\omega/c, kx, ky) = \sum_{n=0}^{n=N} a(\omega/c, n) \cos(nDx\, k)$$

The $a(\omega/c, n)$ are calculated so that $F(\omega, c, k)$ approximates to $F_0(\omega/c, k)$ for small values of $\underline{k}$ and is of modulus less than one until $k_{nyq}$.

The various $\cos(nDx\, k)$ can be deduced from $\cos(Dx\, k)$ by the recursive formula for Chebychev polynomials:

$$\cos(nh) = 2\cos(h)\cos[(n-1)h] - \cos[(n-2)h]$$

where $h = k\, Dx$ = normalized wavelength.

In addition, $\cos(Dx\, k)$ can be approximated by a two-dimensional filter for sampling intervals Dx and Dy:

$$\cos(Dx\, k) = \sum_{n_x=-N_{Mx}}^{n_x=N_{Mx}} \sum_{n_y=-N_{My}}^{n_y=N_{My}} M(n_x, n_y) \exp j(n_x Dx\, k_x + n_y Dy\, k_y)$$

The simplest development of $\cos(Dx\, k)$ is based on the 9-term McClellan transform corresponding to $N_{Mx} = N_{My} = 1$:

$$\cos(Dxk) = -1 + \tfrac{1}{2}[1 + \cos(Dxk_x)][1 + \cos(Dxk_y)]$$

Hale also proposes using an improved McClellan transform having 17 terms, corresponding to $N_{Mx} = N_{My} = 2$ with certain terms that are zero. However, as shown below, even with the improved transform, the final result includes artefacts.

More precisely, the method thus consists in calculating $a(\omega/c, n)$ where $\omega/c$ runs over samples in the range $[\omega_{min}/c_{max}, \omega_{max}/c_{min}]$ and $M(n_x, n_y)$.

We define the operation W'=M*W as follows:

$$W_{\omega, z+dz} = \sum_{n_x=-N_{Mx}}^{n_x=N_{Mx}} \sum_{n_y=-N_{My}}^{n_y=N_{My}} M(n_x, n_y)\, W_{\omega, z}(m_x - n_x, m_y - n_y)$$

Using this notation, the extrapolated field $W_{\omega, z+dz}(m_x, m_y)$ is calculated from $W_{\omega, z}(m_x, m_y)$ for each $\omega$ by means of the following pseudo-code:

1) Initialize:

$T_0 = W_z$ $T_1 = M * W_z$ $W_{z+dz}(m_x, m_y) = b[\omega/c_{z+dz}(m_x,m_y), 0] T_0(m_x,m_y) + b[\omega/c_{z+dz}(m_x,m_y), 1] T_1(m_x,m_y)$ 2) For n=2 to N do:

$T = 2 * M * T_1 - T_0$ $W_{\omega, z+dz}(m_x,m_y) = W_{\omega, z+dz}(m_x,m_y) + b[\omega/c_{z+dz}(m_x,m_y), n] T(m_x,m_y)$ $T_0 = T_1$ $T_1 = T$ 3) End n loop.

OBJECT OF THE INVENTION

An object of the present invention is to improve existing signal processing techniques for geophysical prospecting that make use of a wave field extrapolation operator.

A particular object of the invention is t facilitate calculating the coefficients of convolution operators and to simplify the construction and the application of 3D operators.

INDUSTRIAL APPLICATIONS OF THE INVENTION

Wave field extrapolation is necessary to perform migration, which is an important step in the processing of geophysical data. The present invention can be applied to migration in two or three dimensions before or after summation, to migration in depth and also to migration in time. It is also applicable to modeling which is the inverse operation to migration.

BRIEF SUMMARY OF THE INVENTION

For the purpose of achieving the above object, the present invention provides a method of extrapolating a set of traces recorded by means of an array of sensors in a geophysical prospecting process, the method comprising the steps consisting in:

i) approximating a minus Laplacian $L_0(k_x, k_y) = k_x^2 + k_y^2$ by the sum of two one-dimensional filters; and ii) approximating an extrapolation operator $F_0$ by a polynomial of the minus Laplacian $L_0$.

According to an advantageous feature of the present invention, step i) consists in approximating the minus Laplacian by the sum of two one-dimensional filters of the form:

$$L = \sum_{n=0}^{n=N_{Lx}} d_x(n) \cos(nDx \, k_x) + \sum_{n=0}^{n=N_{Ly}} d_y(n) \cos(nDy \, k_y)$$

According to another advantageous feature of the present invention, step ii) of the extrapolation operator is approximated by a polynomial of the minus Laplacian of the form:

$$F_0(\omega/c, k_x, k_y) = \sum_{n=0}^{n=N} p(\omega/c, n) L_0^n$$

The present invention also provides a geophysical prospecting system of the type comprising:

an artificial soundwave source;

an array of sensors disposed on the surface of the ground and sensitive to waves reflected upwards by the internal strata of the ground;

a recorder connected to said sensors for recording the electrical signals from them;

processor means for processing the recorded signals; and display means for displaying a usable result after processing the signals;

wherein the processor means are adapted to split an extrapolation operator into a real part and an imaginary part, and then to perform synthesis that is optimum in the L–∞ norm sense on each of the two parts.

Other objects, features, and advantages of the present invention appear on reading the following detailed description made with reference to the accompanying drawings given by way of non-limiting example, and in which.

GENERAL STRUCTURE OF THE INVENTION

The general structure of the system used in the present invention is substantially the same as the prior structure outlined in the preamble.

Figure 1:
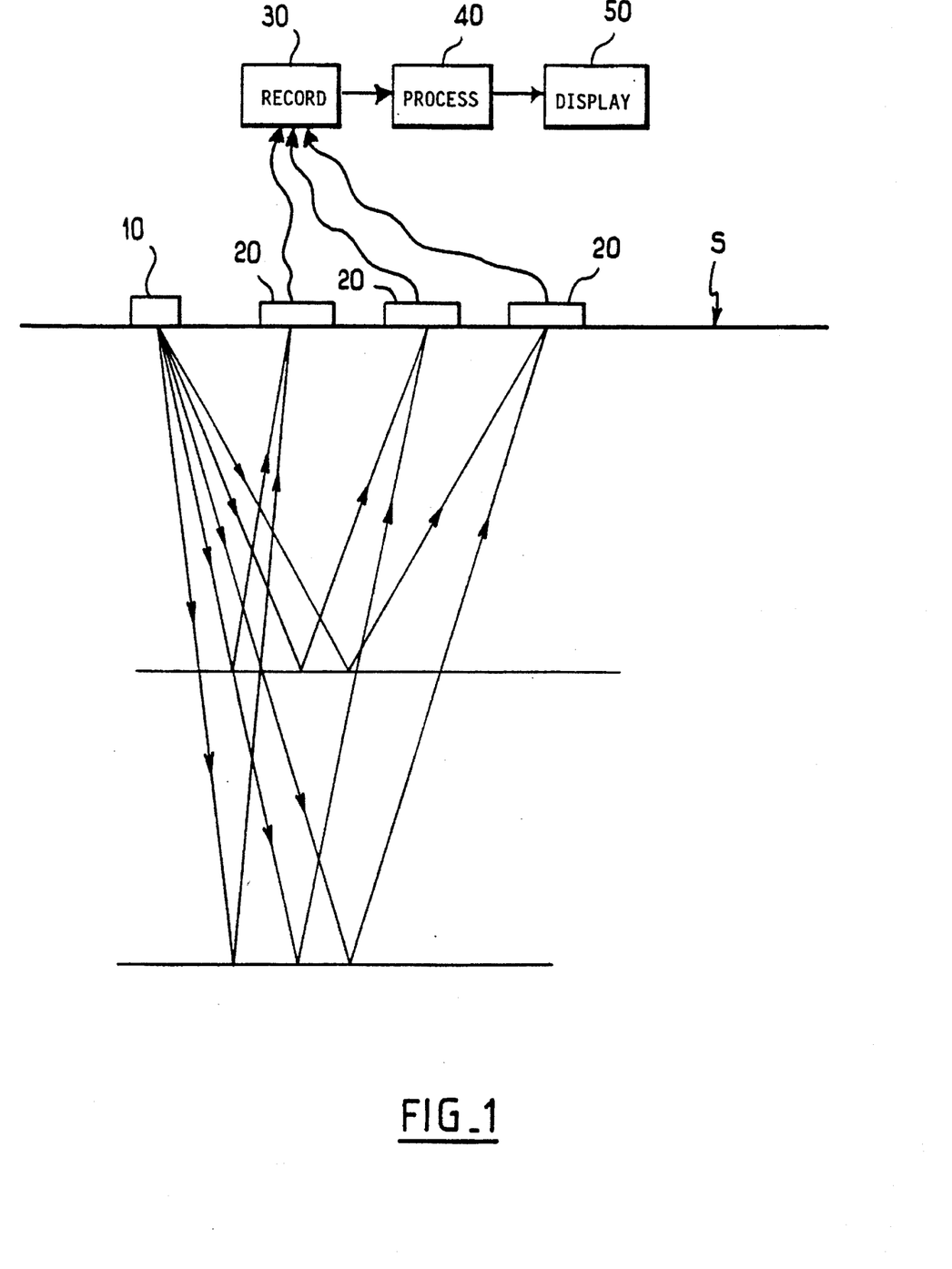
FIG. 1 is a diagram in the form of functional blocks showing a system in accordance with the present invention.

The system comprises: an artificial source 10 of a soundwave or a shockwave derived from explosive or the equivalent; an array of sensors 20 such as geophones or the equivalent disposed on the surface S of the ground and responsive to waves reflected upwards by the internal strata of the ground; a recorder 30 connected to said sensors to record the electrical signals from them in the form of seismograms; processor means 40 for processing the recorded signals; and display means 50 for displaying a usable result after the signals have been processed.

The present invention nevertheless differs from the state of the art in the structure and the function of the processor means 40.

The description below relates to the function of said processor means 40 in the context of the present invention.

INVENTION IN THE FIELD OF 2D EXTRAPOLATION

As mentioned above, the invention proposes performing spectrum synthesis by splitting $F_0(k)$ into its real part and its imaginary part after phase rotation, and then in performing synthesis on each of the two parts in a manner that is optimal in the L–∞ norm sense.

These two L–∞ optimal syntheses can be performed, for example, by using the "Remez exchange algorithm" which is described in reference [6], and which solves the following problem:

Let $S_0(h)$ defined for $h \in [0,\pi]$ be a given symmetrical real spectrum.

Let $W(h)$ defined for $h \in [0,\pi]$ be a given positive real weighting function.

Let N be the half-length of the given filter.

$$S(h) = \sum_{n=0}^{n=N} a(n)\cos(nh) \text{ is the synthesized spectrum.}$$

$E(h)=W(h)[S(h)-S_0(h)]$ is the weighted error function between the synthesized spectrum and the given ideal spectrum.

Find $a(n)$, $n \in [0,N]$ such that:

the $L-\infty$ norm of $E(h) = \max_{h \in [0,\pi]} |E(h)|$ is a minimum.

More precisely, the procedure proposed by the present invention comprises the steps which consist in:

i) Splitting $F_0(k) \exp(j\phi_c)$ into real and imaginary parts:

$$F_0(k) \exp(j\phi_c) = R_0(k) + jI_0(k)$$

Figure 2A:
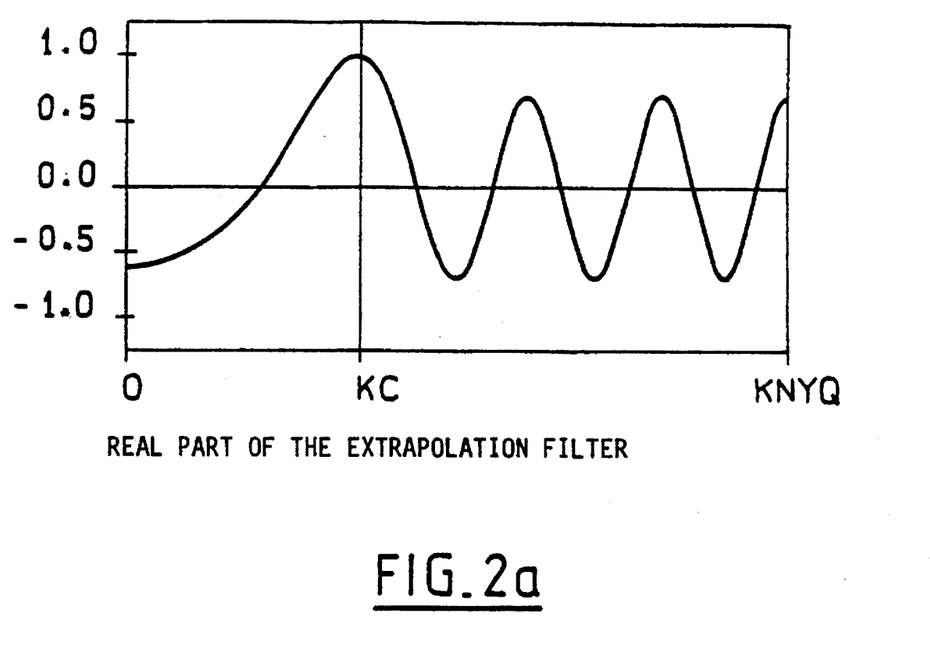
FIG. 2a shows the real part of an extrapolation filter in accordance with the present invention.
Figure 2B:
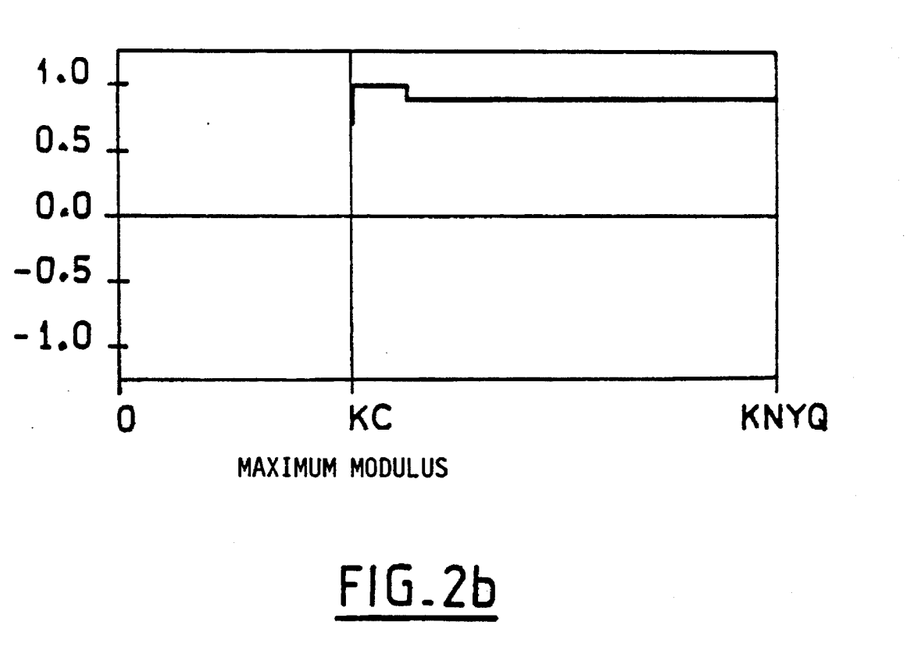
FIG. 2b shows the maximum modulus of such a filter.
Figure 2C:
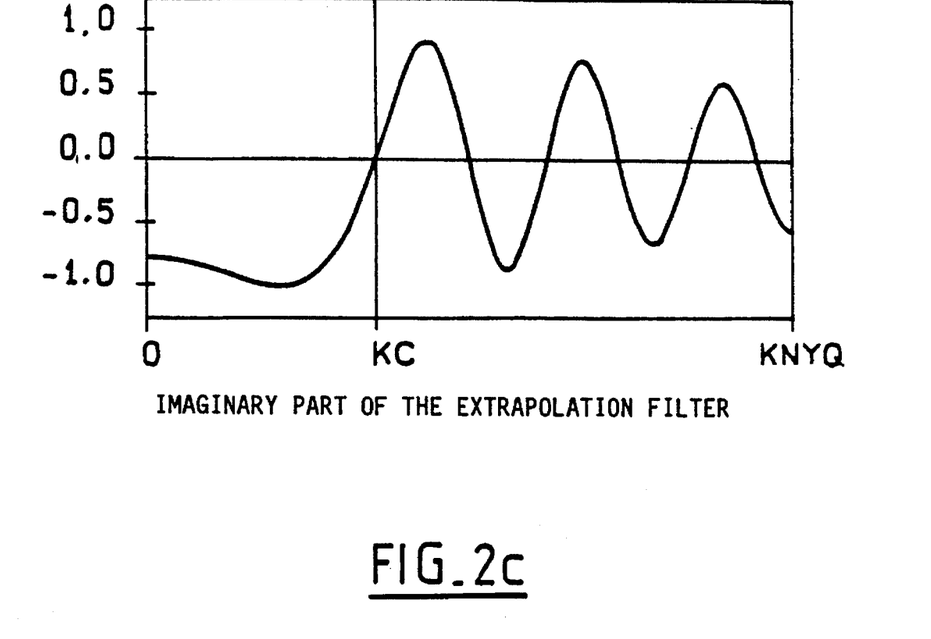
FIG. 2c shows the imaginary part of the extrapolation filter.

$\phi_c$ is calculated in such a manner that $R_0(k)$ has a maximum for $k=k_c$. In particular, $R_0(k_c)=1$ and $I_0(k_c)=0$.

ii) Using the Remez algorithm or any other algorithm, to calculate $a_r(n)$, $n \in [0,N]$ such that:

$$R(k) = \sum_{n=0}^{n=N} a_r(n) \cos(nDx\,k)$$

corresponds to the minimum of $\max_{k \in [0,kc]} |R(k)-R_0(k)|$, while simultaneously requiring the extrema of $R(k)$ over $[k_c, k_{nyq}]$ to have ordinates $\pm\alpha$ where $\alpha$ is a number smaller than one. Accompanying FIG. 2 shows the real part of such an extrapolation filter.

iii) Then calculating the weighting function $W(k)$ for $k \in [k_c, k_{nyq}]$:

$$W(k) = [M^2(k) - R^2(k)]^{-\frac{1}{2}}$$

where $M(k)$ is the maximum modulus in the band $[k_c, k_{nyq}]$, defined by the user. The minimum of $M(k)$ must be greater than $\alpha$ and its maximum must be less than one. An example of such a function is given in accompanying FIG. 2B.

iv) Using the Remez algorithm or any other algorithm, to calculate $a_i(n)$, $n \in [0,N]$ such that:

$$I(k) = \sum_{n=0}^{n=N} a_i(n) \cos(nDx\,k)$$

corresponds to the minimum of $\max_{k \in [0,kc]} |I(k)-I_0(k)|$ while constraining $\max_{k \in [kc,knyq]} W(k)|I(k)|$ to be equal to one. Accompanying FIG. 2c shows the imaginary part of such an extrapolation filter.

$F(k) = [R(k) + jI(k)] \exp(-j\phi_c)$ then satisfies the problem posed. The looked-for coefficients are:

$$a(n) = [a_r(n) + ja_i(n)] \exp(-j\phi_c)$$

Figure 2D:
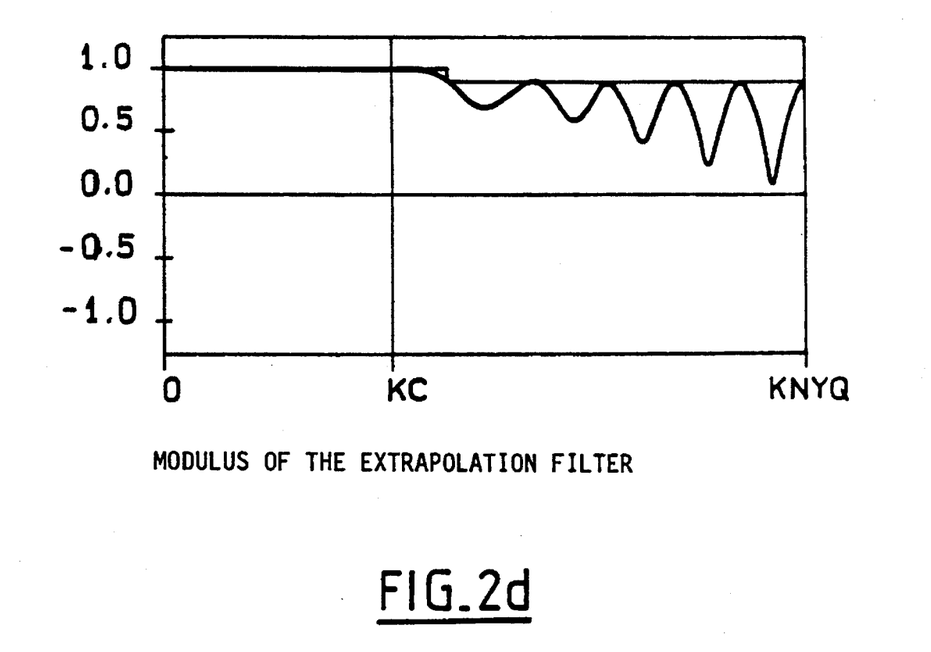
FIG. 2d shows the effective modulus of the extrapolation filter of the present invention.

Accompanying FIG. 2d shows the modulus of the extrapolation filter.

The above-described spectrum synthesis method has advantages over the two existing methods.

One of them (reference [1]) is relatively optimal but coefficient calculation is lengthy and it is optimal in the L–2 norm sense. Unfortunately, it is preferable for the approximation in the passband to be performed for the L–∞ norm, as in the method proposed. Such operators need to be used recursively. Minimizing error on the global operator $F^p(k)$, where p is the number of the extrapolation step in z, for any norm, is equivalent to minimizing error on the unit operator for the L–∞ norm.

The other existing method (reference [2]) is relatively fast, but suboptimal. It is equivalent to minimizing error over a local range $k \in [0,\epsilon]$, with an infinitely small k, wheres the method proposed minimizes error over the entire range $k \in [0, k_c = \omega \sin\theta/c]$, where $\theta$ is the exact maximum propagation angle selected by the user, i.e. the error is minimized for all dip less than a threshold fixed by the user.

Figure 3:
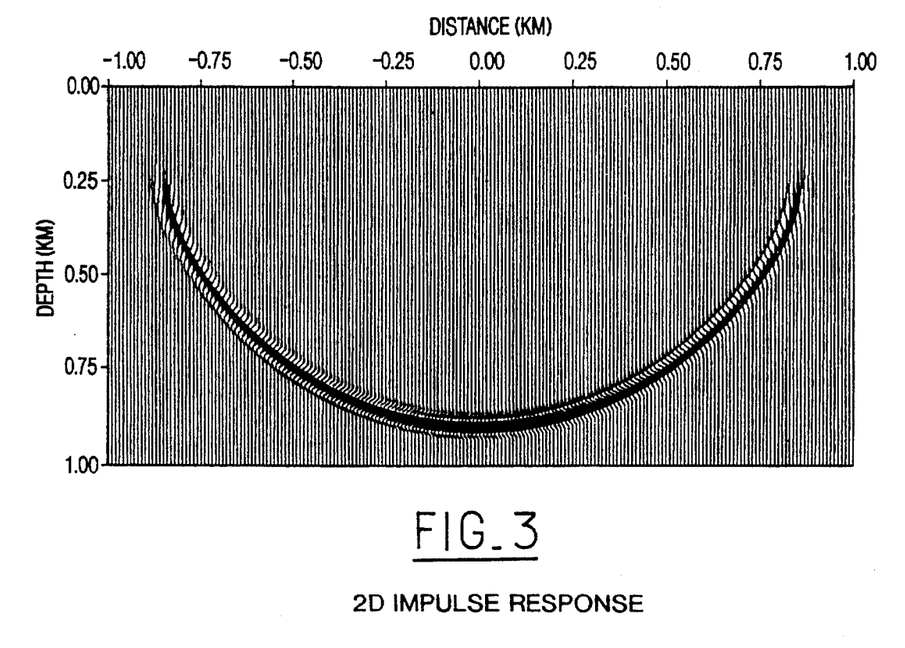
FIG. 3 shows the 2D impulse response obtained in the context of the present invention.

FIG. 3 shows the impulse response obtained over a frequency range of $f_{min}=2$ Hz to $f_{max}=48$ Hz, a velocity $c=2000$ meters per second (m/s) and a target at a depth of $z=900$ m.

INVENTION IN THE FIELD OF 3D EXTRAPOLATION

As mentioned above, one of the major objects of the present invention is to simplify the calculation process used for extrapolating the 3D wave field represented by the recorded traces, and to improve the accuracy thereof.

According to the present invention, this object is achieved by a depth extrapolation method for a wave field recorded by means of an array of sensors in a geophysical prospecting process comprising the steps that consist in putting the extrapolation operator into the form:

$$F_0(\omega/c, k_x, k_y) = \exp jDz(\omega^2/c^2 - L_0)^{1/2}$$

in which $L_0$ designates the minus Laplacian:

$$L_0(k_x, k_y) = k_x^2 + k_y^2$$

More precisely, according to the invention, the extrapolation method comprises the following steps:

i) approximating a minus Laplacian $L_0(k_x, k_y) = k_x^2 + k_y^2$ by the sum of two one-dimensional filters; and ii) approximating an extrapolation operator $F_0$ by a polynomial of the minus Laplacian $L_0$.

The minus Laplacian is preferably approximated by the sum of two one-dimensional filters of the form:

$$L = \sum_{n=0}^{n=N_{Lx}} d_x(n) \cos(nDx\,k_x) + \sum_{n=0}^{n=N_{Ly}} d_y(n) \cos(nDy\,k_y)$$

In addition, in step i) the extrapolation operator is preferably approximated by a polynomial of the minus Laplacian of the form:

$$F_0(\omega/c, k_x, k_y) = \sum_{n=0}^{n=N} p(\omega/c, n) L_0^n$$

The minus Laplacian operator $L_0$ may be split, without approximation, in the form of the sum of two minus second derivative operators, each being capable of being approximated by a one-dimensional filter with $N_{Lx}$ and $N_{Ly}$ cosine terms.

The present invention makes use of the circular symmetry of the extrapolation operator, as proposed by Hale in the context of implementing the McClellan transform.

However, the present invention makes it possible to avoid calculating the 2D filter approximating $\cos[Dx(k_x^2+k_y^2)^{1/2}]$ by using a minus Laplacian operator $L_0=k_x^2+k_y^2$, whereby the extrapolation operator $F_0$ is developed in the form of a polynomial and whose synthesis required 1D filters only.

More precisely, the procedure proposed in the context of the present invention comprises the steps consisting in:

1) Performing spectrum synthesis on the minus second derivative operator in $\underline{x}$, i.e. calculating a symmetrical filter of length $2N_{Lx}+1$ for a sampling interval Dx, whose spectrum $D_x(k)$ defined by:

$$D_x(k) = \sum_{n=-N_{Lx}}^{n=N_{Lx}} d_x(n)\exp(j\,nDx\,k) \quad \text{with} \quad d_x(-n)=d_x(n)$$

approximates the spectrum of the minus second derivative $D_0(k)=k^2$, over $k\in[0,\alpha_x k_{nyqx}]$ with $0<\alpha_x<1$ (where $\alpha_x$ is typically equal to 0.7). No constraint is put on $D_x(k)$ over $k\in[\alpha_x k_{nyqx}, k_{nyqx}]$ (when $\alpha_x$ is small, it is optionally possible to constrain $D_x(k)$ not to exceed a certain value).

2) Do the same for $\underline{y}$:

$$D_y(k) = \sum_{n=-N_{Ly}}^{n=N_{Ly}} d_y(n)\exp(j\,nDy\,k) \quad \text{with} \quad d_y(-n)=d_y(n)$$

3) Define $L(k_x,k_y)=D_x(k_x)+D_y(k_y)$ which is the spectrum synthesis of the minus Laplacian $L_0(k_x,k_y)=k_x^2+k_y^2$ over the rectangle $k_x\in[-\alpha_x k_{nyqx},\alpha_x k_{nyqx}], k_y\in[-\alpha_y k_{nyqy},\alpha_y k_{nyqy}]$.

In practice, $d_x(n)$ and $d_y(n)$ are calculated first (they are a priori independent of $\omega/c$, but they may depend thereon). Thereafter the limits $[L_{min}, L_{max}]$ of $L(k_x,k_y)$ are calculated as the sum of the limits of $D_x(k)$ and $D_y(k)$. $\theta$ is chosen, namely the maximum angle of propagation to be taken into consideration relative to the vertical. For given angular frequency and velocity, that corresponds to a wavenumber $k_c=\omega\sin\theta/c$. Then for each $\omega/c$ over sampling in the range $[\omega_{min}/c_{max}, \omega_{max}/c_{min}]$, the $p(\omega/c,n)$ are calculated as a polynomial development of $F_0(\omega/c,L)$. $F(\omega/c,L)$ should approximate $F_0(\omega/c,L)$ for $L\in[L_{min},L_c=k_c^2=\omega^2\sin^2\theta/c^2]$ and its modulus must be less than 1 for $L\in[L_c,L_{max}]$.

We define the operation $W'=L*W$ by:

$$W'(n_x,n_y) = \sum_{n=-N_{Lx}}^{n=N_{Lx}} d_x(n)\,W(n_x-n,n_y) + \sum_{n=-N_{Ly}}^{n=N_{Ly}} d_y(n)\,W(n_x,n_y-n)$$

W' approximates the minus Laplacian of W.

With this notation, the calculation of the extrapolated field $W_{\omega,z+dz}(m_x,m_y)$ from $W_{\omega,z}(m_x,m_y)$ is performed for each $\omega$ by pseudo-code comprising the following steps:

1) Initialize:

$$W_{z+dz}(m_x,m_y)=p[\omega/c(m_x,m_y),N]W_z(m_x,m_y) \quad \text{then}$$

2) For $n=N-1$ to 0 do:

$$W_{z+dz}(m_x,m_y)=(L*W_{z+dz})(m_x,m_y)+p[\omega/c(m_x,m_y),n]W_z(m_x,m_y)$$

There follows a description of the method proposed in the context of the present invention for calculating coefficients in 3D extrapolation.

It has been shown how the synthesis of $F_0(\omega/c,k_x,k_y)$ can be reduced to synthesizing 1D coefficients: a 1D polynomial $p(\omega,c/n)$ is synthesized and two 1D spectrum syntheses are performed of symmetrical real spectra $d_x(n)$ and $d_y(n)$. We now describe a calculation procedure for these coefficients.

$d_x(n)$ and $d_y(n)$ can be synthesized merely by using the Remez algorithm with $S_0(h)=h^2$, $W(h)=1$ for $h\in[0,\alpha_x\pi]$, $W(h)=\epsilon$ for $h\in[\alpha_x\pi,\pi]$, where $\epsilon$ is a small number equal to about 0.05.

It is shown that synthesis of the polynomial can be reduced to spectrum synthesis. In addition, this can be done with the method described above for 2D extrapolation.

The polynomial synthesis to be performed is as follows:

Let there be a given complex function $F_0(L)$, a range $[L_{min}, L_{max}]$ and a value $L_c$. Coefficients $p(n)$ must be found for $n\in[0,N]$, such that:

$$F(L) = \sum_{n=0}^{n=N} p(n)\,L^n$$

is an approximation of $F_0(L)$ over $[L_{min}, L_{max}]$ and the modulus of $F(L)$ is less than one over $[L_c, L_{max}]$.

Perform a change of variable:

$L=\frac{1}{2}(L_{min}-L_{max})\cos(h)+\frac{1}{2}(L_{min}+L_{max})=g(h)$ with $L\in[L_{min},L_{max}]$, $h\in[0,\pi]$ $F_0[g(h)]=S_0(h)$ is a known symmetrical spectrum.

Write $h_c=g^{-1}(L_c)$.

The following spectrum synthesis problem is solved, e.g. using the method proposed above:

Find $t(n)$, $n\in[0,N]$ such that $$S(h) = \sum_{n=0}^{n=N} t(n)\cos(nh)$$

approximates $S_0(h)$ for $h\in[0,h_c]$ and has a modulus of less than one over $[h_c,\pi]$.

Once the $t(n)$ defining $S(h)$ have been calculated, the method described below, $F(L)=S(g^{-1}(L))$ solves the problem posed.

Changing the variable $L=g(h)$ transforms a polynomial of degree N in L into a polynomial of degree N in $\cos(h)$ and thus, on the basis of Chebychev polynomials, into a sum of $\cos(nh)$ for $\underline{n}$ varying from 0 to N. Thus, conversely, $h=g^{-1}(L)$ transforms a cosine spectrum into a polynomial. Furthermore, the L–∞ norm is invariant over a change of variable. Thus, if the spectrum synthesis is optimal for the L–∞ norm, then so is the polynomial synthesis.

More precisely, F(L) can be written in the form:

$$F(L) = \sum_{n=0}^{n=N} t(n)\,T_n[(2L-L_{min}-L_{max})/(L_{min}-L_{max})] \quad (4)$$

$T_n(x)$ being the Chebyhev polynomial of degree $\underline{n}$ defined by $T_n(\cos h)=\cos nh$.

This is then reduced to the form:

$$F(L) = \sum_{n=0}^{n=N} p(n)\,(AL/L_{max})^n \quad (5)$$

where A is a scale factor which is typically equal to 4. By developing in $(AL/L_{max})^n$ instead of in $L^n$, it is possible to have coefficients $p(n)$ of smaller dynamic range, and therefore to reduce numerical problems.

F(L) is taken from form (4) to form (5) by writing:

$$p(m) = \sum_{n=0}^{n=m} a(m,n)\,t(n)$$

where the terms a(m,n) are defined by:

$$T_m[(2L - L_{min} - L_{max})/(L_{min} - L_{max})] = \sum_{n=0}^{n=m} a(m, n) (AL/L_{max})^n$$

with the terms in a(m,n) being calculated recursively by writing:

$$T_m(x) = 2xT_{m-1}(x) - T_{m-2}(x) \text{ with}$$

$$x = (2L - L_{min} - L_{max})/(L_{min} - L_{max})$$

When N is large, it may be impossible to find an A that avoids problems with machine precision. Under such circumstances, it is necessary to remain in the Chebychev polynomial form (4). The pseudo-code of the method then becomes similar to that of the Hale method, but the operator M which is rectangular in shape in the domain (x,y) is replaced by the operator $(2L - L_{min} - L_{max})/(L_{min} - L_{max})$ which is in the form of a cross in the domain (x,y).

With F(L) in form (4), the following pseudo-code is used:
1) Initialize:

$$T_0 = W_x$$

$$T_1 = L*W_z$$

$$W_{x+dz}(m_x,m_y) = t[\omega/c_{z+dz}(m_x,m_y),0]T_0(m_x,m_y) + t[\omega/c_{z+dz}(m_x,m_y),1]T_1(m_x,m_y)$$

2) for n=2 to N do:

$$T = 2*L*T_1 - T_0$$

$$W_{z+dz}(m_x,m_y) = W_{z+dz}(m_x,m_y) + t[\omega/c_{z+dz}(m_x,m_y),n]T(m_x,m_y)$$

$$T_0 = T_1$$

$$T_1 = T$$

end n loop
with W'=L*W defined by $$W'(n_x, n_y) = \sum_{n=-N_{Lx}}^{n=N_{Lx}} [2d_x(n)/(L_{min} - L_{max})] W(n_x - n, n_y) +$$

$$\sum_{n=-N_{Ly}}^{n=N_{Ly}} [2d_y(n)/(L_{min} - L_{max})] W(n_x, n_y - n) -$$

$$(L_{min} + L_{max}) W(n_x, n_y)/(L_{min} - L_{max}).$$

With F(L) in the form (5), the pseudo-code used is as follows:
1) Initialize $$W_{z+dz}(m_x,m_y) = p[\omega/c(m_x,m_y),N]W_z(m_x,m_y) \text{ then}$$

2) For n=N-1 to 0, do:

$$W_{z+dz}(m_x,m_y) = L(*W_{z+dz})(m_x,m_y) + p[\omega/c(m_x,m_y),n]W_z(m_x,m_y)$$

with W'=L*W defined by $$W'(n_x, n_y) = \sum_{n=-N_{Lx}}^{n=N_{Lx}} [Ad_x(n)/L_{max}] W(n_x - n, n_y) +$$

$$\sum_{n=-N_{Ly}}^{n=N_{Ly}} [Ad_y(n)/L_{max}] W(n_x, n_y - n)$$

EXTENSION OF THE METHOD TO 3D EXTRAPOLATION IN TIME

Extrapolating a wave field in time makes it possible to perform time migration before or after summing, and such a step is often used in geophysical processing. Time migration is less accurate than depth migration, but it can be done with a velocity model $c_z(m_x,m_y)$ that is much less accurate, which is why it is useful.

Unlike the above-described state of the art methods, the method proposed by the present invention can be extended to extrapolation in time. In which case, the $k_x, k_y$ extrapolation function for a time extrapolation step Dt is:

$$G_0(\omega, c, k_x, k_y) = \exp jDt(\omega^2 - c^2 L_0)^{1/2} \text{ with } L_0(k_x, k_y) = k_x^2 + k_y^2$$

$G_0(\omega,c)$ depends this time on $\omega$ and on $c$ separately and cannot be put in the form $G_0(\omega/c)$. A method based on tabulation would require a filter for each $\omega$ and for each $c$ and that would be prohibitive in calculation time and in storage requirements.

By using a monomial development of the form $L^n$, the method proposed makes it possible to tabulate coefficients for the minimum velocity $c_{min}$ only, and to deduce the coefficients that correspond to an arbitrary velocity $c$ by an operation that is very simple and that can be performed whenever it needs to be applied.

The following is written:

$$G_0(\omega, c_{min}, k_x, k_y) = \exp jDt(\omega^2 - c_{min}^2 L)^{1/2} \approx$$

$$\sum_{n=0}^{n=N} p(\omega, c_{min}, n) (AL/L_{max})^n = G(\omega, c_{min}, k_x, k_y)$$

The terms in $p(\omega, c_{min}, n)$ are precalculated and tabulated for sampling over $\omega \in [\omega_{min}, \omega_{max}]$. For an arbitrarily velocity $c$, the following is written:

$$G_0(\omega, c, k_x, k_y) = \exp jDt(\omega^2 - c^2 L)^{1/2} \approx$$

$$\sum_{n=0}^{n=N} p(\omega, c, n) (AL/L_{max})^n = G(\omega, c, k_x, k_y)$$

$$G_0(\omega, c, k_x, k_y) = \exp jDt[\omega^2 - c_{min}^2(Lc^2/c_{min}^2)]^{1/2} \approx$$

$$\sum_{n=0}^{n=N} p(\omega, c_{min}, n) (c/c_{min})^{2n} (AL/L_{max})^n = G(\omega, c, k_x, k_y)$$

Thus $p(\omega,c,n) = (c/c_{min})^{2n} p(\omega,c_{min},n)$ provides an approximation to $G_0(\omega,c,k_x,k_y)$.

The terms in $p(\omega,c_{min},n)$ must be calculated over $[L_{min}c_{max}^2/c_{min}^2, L_{max}c_{max}^2/c_{min}^2]$ instead of $[L_{min}, L_{max}]$. In this way, stability (the fact that the modulus is never greater than one) is ensured for all velocities $c$ and not only for the tabulated velocity. Tabulation is performed with $L_c = \omega^2 \sin^2\theta/c_{min}^2$ such that this value of $L_c$ is greater than the values of $L_c$ required for other velocities. That is why it is necessary to tabulate for $c_{min}$ rather than for arbitrary $c_0$.

If the ratio $c_{max}/c_{min}$ is too great, it is possible to tabulate for two or three values of c: $c_{min}, c_{int1}, c_{int2}, \ldots$, and while calculating $p(\omega,c,n)$ to use the immediately smaller tabulated value for $c$.

ADVANTAGES OF THE INVENTION

The method of the present invention provides considerable advantages over the prior art, in particular over the method proposed by Hale in reference [4].

Firstly, the method of the present invention based on a polynomial development and a spectrum synthesis of the Laplacian requires only one bank of polynomial coefficients having a dimension $p(\omega/c,n)$ and two symmetrical filters of dimensions $d_x(n)$ and $d_y(n)$ to be calculated and applied whereas the method proposed by Hale requires a bank of filters of dimension $b(\omega/c,n)$ and a two-dimensional filter $M(n_x,n_y)$ (e.g. a 9-term or 17-term McClellan transform) to be calculated and applied. The method of reference [3] requires a bank of two-dimensional filters $a(\omega/c,n_x,n_y)$ to be calculated and applied, and is therefore much lengthier to perform.

Furthermore, we have shown that calculating a polynomial development can be reduced to calculating a symmetrical spectrum. The same algorithm can therefore be used both for polynomial development and for spectrum development. The spectrum and polynomial approximations are then of similar accuracy for an identical number of terms.

Finally, with an identical number of terms, spectrum synthesis of the Laplacian gives better accuracy than does spectrum synthesis of the function $\cos[Dx(k_x^2+k_y^2)^{1/2}]$ of which the McClellan transform is a special case. With the method proposed, since only one-dimensional symmetrical spectra need to be calculated, we can use algorithms that are optimal and fast. In addition, the application of a Laplacian that has the form of a cross in the (x,y) domain is faster than the application of a $\cos[Dx(k_x^2+k_y^2)^{1/2}]$ which is in the form of a rectangle.

Furthermore, having $Dx \neq Dy$ (which is usually the case in practice), complicates the Hale method, whereas it presents no problem with the method proposed.

Another considerable advantage of the method proposed is that time extrapolation is possible using a one-dimensional table, whereas a two-dimensional table is required to perform time extrapolation with existing methods (thus making them impracticable).

Figure 4:
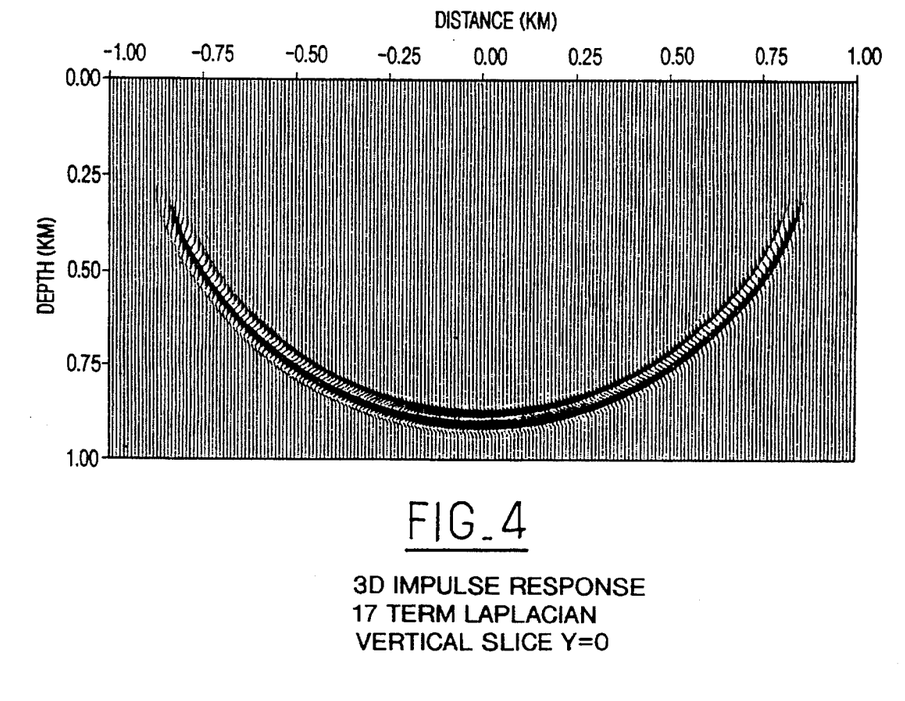
FIG. 4 shows a 3D impulse response using a 17-term Laplacian in accordance with the present invention for a vertical slice with y=0.

FIG. 4 shows a vertical slice with y=0 through an impulse response corresponding to:

Dx=Dy=Dz=10 m, c=1000 m/s, $\theta$=60°, $f_{min}$=2 Hz, $f_{max}$= 48 Hz, z=900 m, $n_{Lx}=N_{Ly}$=4 such that the Laplacian comprises 17 coefficients. The polynomial development is of degree 15.

Figure 5:
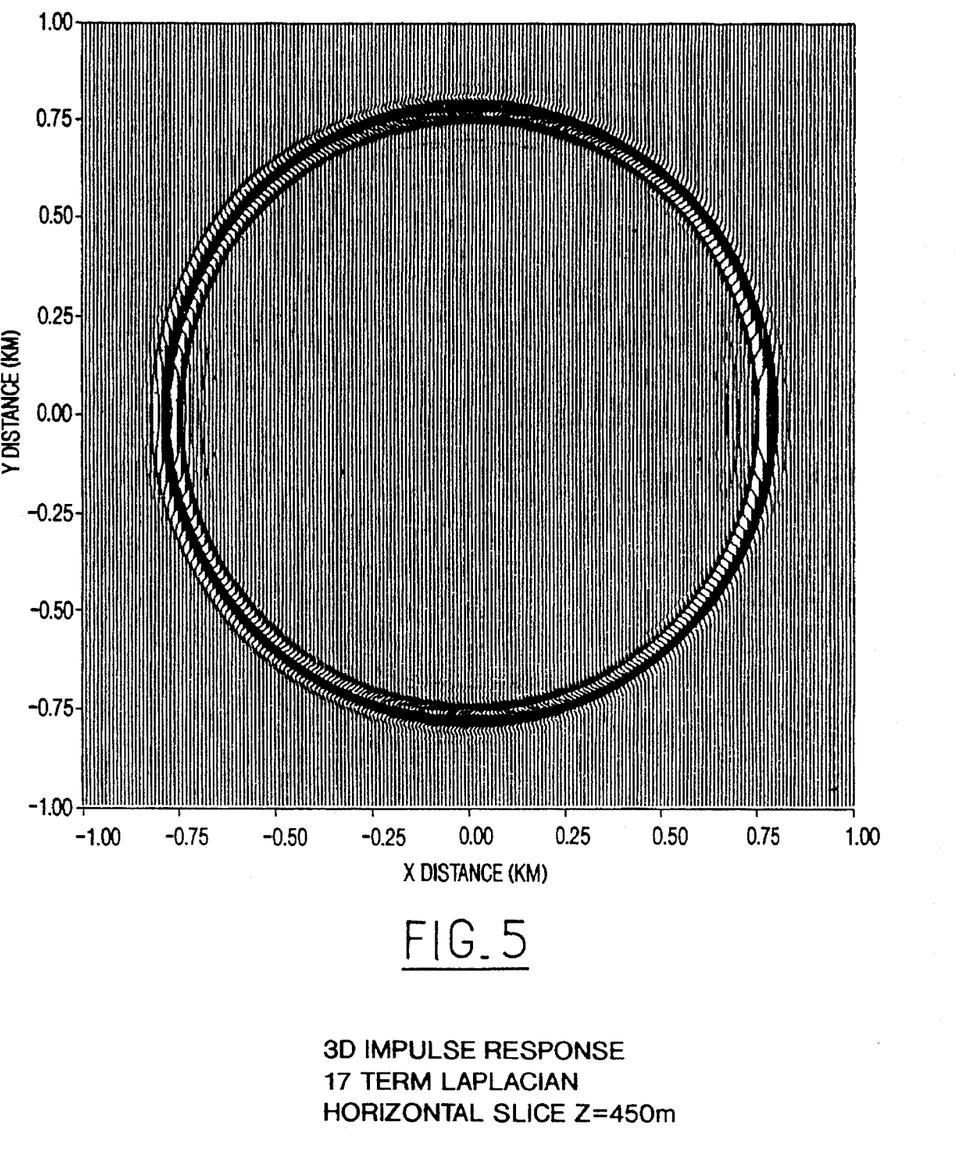
FIG. 5 shows a 3D impulse response using a 17-term Laplacian in accordance with the present invention for a horizontal slice with z=450 meters (m)

FIG. 5 shows a horizontal slice obtained in the context of the present invention by means of a method implementing a 15-term polynomial development and a 17-term Laplacian synthesis, for z=450 m, i.e. an angle of 60°.

Figure 6:
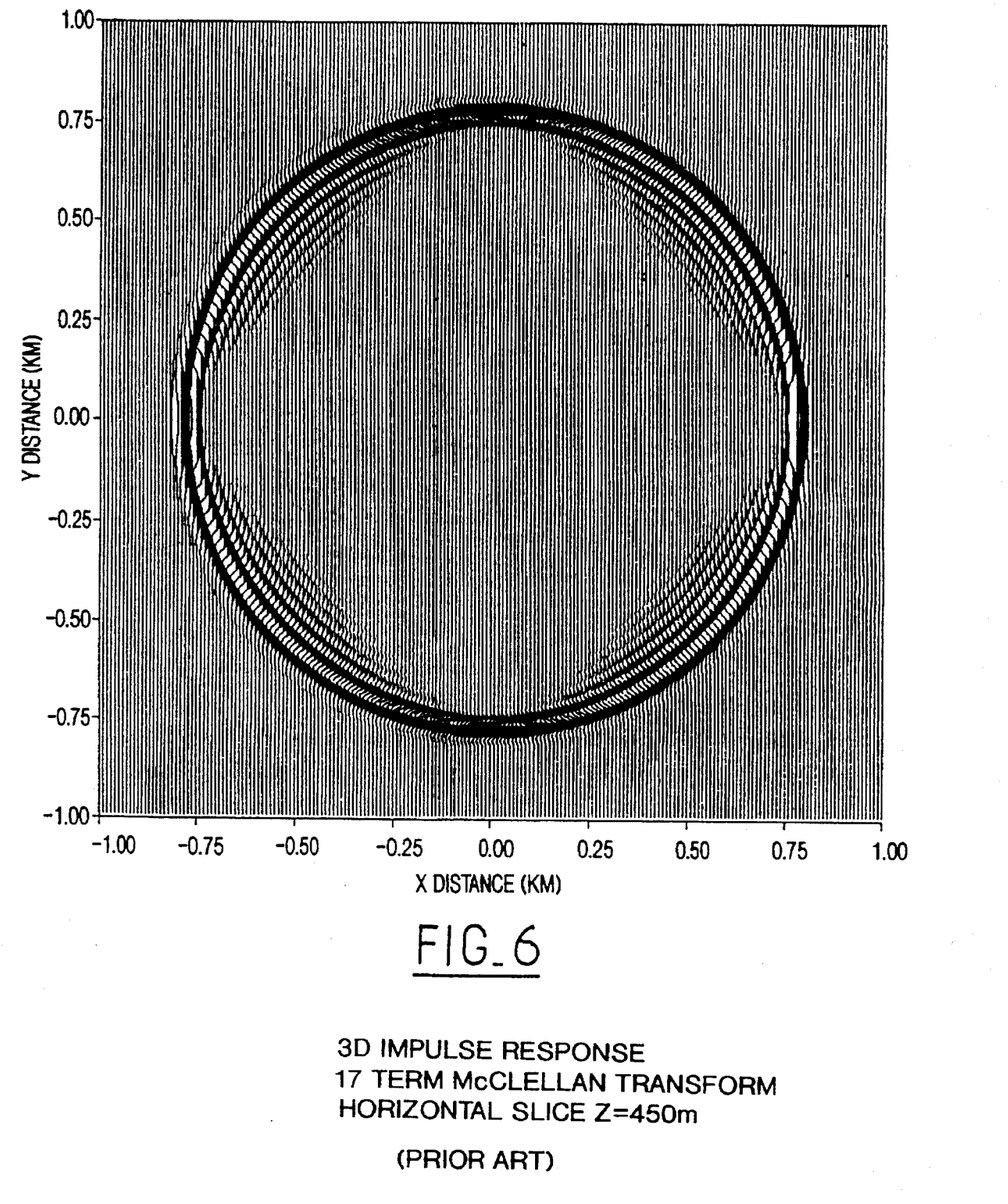
FIG. 6 shows a 3D impulse response with a 17-term McClellan transform from the stat of the art, for a horizontal slice with z=450 m.

FIG. 6 shows a horizontal slice obtained using a conventional method comprising a 12-term spectrum development and a 17-term McClellan transform, for the same depth of z=450 m. The 12-term spectrum development is calculated by the spectrum synthesis method using two L-$\infty$ optimizations as described above.

It may be observed that the artefacts visible in FIG. 6 do not have circular symmetry. It is therefore clear that they are not the result of an error in the 12-term development, but are necessarily the result of an error in the 17-term McClellan transform.

The present invention is naturally not limited to the process described above but extends to any variant that comes within the spirit of the invention.

BIBLIOGRAPHIC REFERENCES

[1] O. Holberg: Towards Optimum One-way Wave Propagation, Geophysical Prospecting, Vol. 36, No. 1, pp. 99–114, February, 1988.

[2] D. Hale: Stable, Explicit Depth Extrapolation of Seismic Wavefields, Geophysics, Vol. 56, No. 11, pp. 1770–1777, November, 1991.

[3] G. Blaquière, H. W. J. Debeye, C. P. A. Wapenaar, A. J. Berkhout: 3-D table-driven Migration, Geophysical Prospecting, Vol. 37, No. 8, pp. 925–928, November, 1989.

[4] D. Hale: 3-D Depth Migration via McClellan Transformations, Geophysics, Vol. 56, No. 11, pp. 1778–1785, November, 1991.

[5] J. H. McClellan: The Design of Two-Dimensional Filters by Transformations, Proc. 7th Annual Princeton Conf. on Inform. Sci. and Syst., pp. 247–251, 1973.

[6] J. H. McClellan, T. W. Parks: Equiripple Approximation of Fan Filters, Geophysics, Vol. 37, No. 4, pp. 573–583, August, 1972.

I claim:

1. A geophysical prospecting method comprising the steps of:

a) recording in form of a set of traces, by means of an array of sensors on a surface, seismic waves coming from an artificial source after the waves have been reflected and/or refracted underground, b) extrapolating in depth the set of traces recorded on the surface by convolution of an extrapolation operator Fo and a Fourier transform of the recorded wave field corresponding to the set of traces, said extrapolating step comprising the steps of:

i) approximating a minus Laplacian $L_o(k_x,k_y)=k_x^2+k_y^2$ by the sum of two one-dimensional filters of the form:

$$L = \sum_{n=0}^{N_{Lx}} d_x(n) \cos(nDx\, k_x) + \sum_{n=0}^{N_{Ly}} d_y(n) \cos(nDy\, k_y)$$

, wherein synthesis of the minus Laplacian consists in:

1) performing spectrum synthesis of the minus second derivative operator in x, by calculating a symmetrical filter of length $2n_{Lx}+1$ with a sampling interval Dx, where the spectrum $D_x(k)$ defined by:

$$D_x(k) = \sum_{n=-N_{Lx}}^{N_{Lx}} d_x(n) \exp(j\, nDx\, k) \text{ with } d_x(-n) = d_x(n)$$

approximates the spectrum of the minus second derivative $D_0(k)=k^2$ over $k \in \{0, \alpha_x k_{nyqx}\}$ with $0<\alpha_x<1$ 2) performing spectrum synthesis of the minus second derivative operator in y by calculating a symmetrical filter of length $2N_{Ly}+1$ for a sampling step size Dy, whose spectrum Dy(k) defined by:

$$D_y(k) = \sum_{n=-N_{Ly}}^{N_{Ly}} d_y(n) \exp(j\, nDy\, k) \text{ with } d_y(-n) = dy(n)$$

approximates the spectrum of the minus second derivative $D_0(k)=k^2$ over $k \in \{0, \alpha_y k_{nyqx}\}$ with $0<\alpha_y<1$; and 3) defining $L(k_x,k_y)=D_x(k_x)+D_y(k_y)$ which is the spectrum synthesis of the minus Laplacian $L_o(k_x,k_y)=k_x^2,k_y^2$ over the rectangle $k_x \in \{-\alpha_x k_{nyqx}, \alpha_x k_{nyqx}\}$, $k_y \in \{-\alpha_y k_{nyqy}, \alpha_y k_{nyqy}\}$; and ii) computing the boundaries {Lmin, Lmax} of the synthesized minus Laplacian L, and choosing a maximum propagation angle theta, iii) computing a cutoff Laplacian value
Lc=(omega/c)$^2$ sin$^2$ (theta) and synthesizing a polynomial of the minus Laplacian L that approximates the exact extrapolation operator for the values $L \in \{Lmin, Lc\}$, while having a modulus less than one over $L \in \{Lc, Lmax\}$; and C) providing an image of the underground formation on the basis of said extrapolation step.

2. A method according to claim 1, wherein step iii) the extrapolation operator is approximated by a polynomial of the minus Laplacian of the form:

$$F_0(\omega/c, k_x, k_y) = \sum_{n=0}^{n=N} p(\omega/c, n) L_0^n.$$

3. A method according to claim 1, wherein the coefficients $d_x(n)$ and $d_y(n)$ of the minus Laplacian are synthesized by using the Remez algorithm, with $S_0(h)=h^2$, $W(h)=1$ for $h \in [0, \alpha_x, \pi]$, $W(h)=\epsilon$ for $h \in [\alpha_x, \pi, \pi]$ where $\epsilon$ is a small number equal to about 0.05.

4. A method according to claim 1, wherein the depth extrapolation consists in:
1) initializing $$W_{z+dz}(m_x, m_y) = p[\omega/c(m_x, m_y), N] W_z(m_x, m_y) \text{ then}$$

2) for n=N-1 to 0 doing:

$$W_{z+dz}(m_x, m_y) = (L*W_{z+dz})(m_x, m_y) + p[\omega/c(m_x, m_y), n] W_z(m_x, m_y)$$

with W'=L*W defined by $$W'(n_x, n_y) = \sum_{n=-N_{Lx}}^{n=N_{Lx}} d_x(n) W(n_x-n, n_y) + \sum_{n=-N_{Ly}}^{n=N_{Ly}} d_y(n) W(n_x, n_y-n).$$

5. A method according to claim 1, wherein the polynomial synthesis of step iii) of the extrapolation operator is performed in the form of a spectrum synthesis on the basis of steps consisting in:
changing variable:
$L=\frac{1}{2}(L_{min}-L_{max}) \cos(h) + \frac{1}{2}(L_{min}-L_{max}) = g(h)$ with $L \in \{L_{min}, L_{max}\}$, $h \in \{0, \pi\}$, and $F_0\{g(h)\}=S_0(h)$ being a known symmetrical spectrum
finding t(n), $n \in \{0, N\}$ such that $$S(h) = \sum_{n=0}^{N} t(n) \cos(nh)$$

approximates to $S_0(h)$ for $h \in \{0, h_c\}$ and has a modulus of less than one over $\{h_c, \pi\}$ with $h_c=g^{-1}(L_c)$; and then defining $F(L)=S(g^{-1}(L))$.

6. A method according to claim 1, further including a time 3D extrapolation stage on the basis of the extrapolation function which is written for one time extrapolation step Dt:

$$G_0(\omega, c, k_x, k_y) = \exp jDt(\omega^2 - c^2 L_0)^{1/2} \text{ with } L_0(k_x, k_y) = k_x^2 + k_y^2$$

which time 3D extrapolation stage consists in:
tabulating the coefficients $p(\omega, c_{min}, n)$ of the polynomial development for at least one determined velocity value $(c_{min})$; and
calculating the other required coefficients $p(\omega, c, n)$ by multiplying the tabulated coefficients by $(c/c_{min})^{2n}$, i.e. $p(\omega, c, n) = (c/c_{min})^{2n} p(\omega, c_{min}, n)$.

7. A method according to claim 1, including the step consisting in splitting an extrapolation operator into a real part and an imaginary part, and then in performing synthesis that is optimum in the L-∞ sense on each of the two parts.

8. A method according to claim 7, wherein the L-∞ optimum synthesis on the real part and on the imaginary part of the extrapolation operator is performed by using the Remez algorithm.

9. A method according to claim 7, wherein the optimum synthesis of the real part and of the imaginary part of the extrapolation operator consists in looking for a(n), $n \in [0, N]$ of the synthesized spectrum:

$$S(h) = \sum_{n=0}^{n=N} a(n) \cos(nh)$$

such that the
L-∞ norm of $E(h) = \max_{h \in [0, \pi]} |E(h)|$ is a minimum with:
$S_0$ defining for $h \in [0, \pi]$ a given symmetrical real spectrum;
W(h) defining for $h \in [0, \pi]$ a given positive real weighting function;
N being the half-length of the given filter; and
$E(h) = W(h)[S(h) - S_0(h)]$ being the weighted error function between the synthesized spectrum and the given ideal spectrum.

10. A method according to claim 7, wherein the extrapolation operator is synthesized by means of the steps consisting in:
i) splitting the extrapolation operator $F_0(k) \exp(j\phi_c)$ into real and imaginary parts;

$$F_0(k) \exp (j\phi_c) = R_0(k) + jI_0(k)$$

$\phi_c$ being calculated in such a manner that $R_0(k)$ has a maximum for $k=k_c$;
ii) calculating $a_r(n)$, $n \in [0, N]$, such that $$R(k) = \sum_{n=0}^{n=N} a_r(n) \cos(nDx \, k)$$

corresponds to the minimum of $\max_{k \in [0, kc]} |R(k) - R_0(k)|$, while constraining the extreme values of R(k) over $[k_c, k_{nyq}]$ to have ordinates $\pm \alpha$ where $\alpha$ is a number smaller than one;
iii) calculating the weighting function W(k) for $k \in [k_c, k_{nyq}]$:

$$W(k) = [M^2(k) - R^2(k)]^{-1/2}$$

where M(k) is the maximum modulus in the band $[k_c, k_{nyq}]$ defined by the user;
iv) calculating $a_i(n)$, $n \in [0, N]$ such that:

$$I(k) = \sum_{n=0}^{n=N} a_i(n) \cos(nDx \, k)$$

corresponds to the minimum of $\max_{k \in [0, kc]} |I(k) - I_0(k)|$ while constraining $\max_{k \in [kc, knyq]} W(k)|I(k)|$ to be equal to one; and
v) defining the extrapolation operator by summing the syntheses obtained in steps ii) and iv), i.e.:

$$F(k) = [R(k) + jI(k)] \exp(-j\phi_c)$$

the looked-for coefficients of the operator being:

$$a(n)=[a_r(n)+ja_i(n)] \exp(-j\phi_c).$$

11. A method according to claim 7, wherein in step i), the following is set:

$$R_0(k_c)=1 \text{ and } I_0(k_c)=0.$$

12. A method according to claim 7, wherein in step iii) the minimum of M(k) is constrained to be greater than $\alpha$ and its maximum is constrained to be less than one.

13. A geophysical prospecting system of the type comprising:
   an artificial soundwave source;
   an array of sensors disposed on the surface of the ground and sensitive to waves reflected upwards by the internal strata of the ground;
   a recorder connected to said sensors for recording the electrical signals from them;
   processor means for processing the recorded signals to extrapolate in depth the recorded signals by convolution of an extrapolation operator and a Fourier transform of the recorded signals; and
   display means for displaying an image of the underground formation after processing the signals;
   wherein the processor means are adapted to split an extrapolation operator into a real part and an imaginary part, and then to perform synthesis L–∞ norm sense optimal on each of the two parts.

14. A system according to claim 13, wherein the processor means perform L–∞ optimum synthesis on the real part and on the imaginary part of the extrapolation operator with the Remez algorithm.

15. A system according to claim 13, wherein the processor means perform optimum synthesis of the real part and of the imaginary part of the extrapolation operator by searching for a(n), n∈[0,N] of the synthesized spectrum:

$$S(h) = \sum_{n=0}^{n=N} a(n) \cos(nh)$$

such that the L–∞ norm of E(h)=$\max_{h \in [0,\pi]}$ |E(h)| is a minimum
with:
   $S_0$ defining a given symmetrical real spectrum for h∈[0,π];
   W(h) defining a given positive real weighting function for h∈[0,π];
   N being the given filter half-length; and
   E(h)=W(h)[S(h)–$S_0$(h)] being the weighted error function between the synthesized spectrum and the given ideal spectrum.

16. A system according to claim 13, wherein the processor means synthesize the extrapolation operator with steps consisting in:
   i) splitting the extrapolation operator $F_0(k) \exp(j\phi_c)$ into real and imaginary parts;

$$F_0(k) \exp(j\phi_c)=R_0(k)+jI_0(k)$$

$\phi_c$ being calculated in such a manner that $R_0(k)$ has a maximum for k=$k_c$;

ii) calculating $a_r(n)$, n∈[0,N], such that $$R(k) = \sum_{n=0}^{n=N} a_r(n) \cos(nDx\,k)$$

corresponds to the minimum of $\max_{k \in [0,kc]}$ |R(k)–$R_0$(k)|, while constraining the extreme values of R(k) over [$k_c$,$k_{nyq}$] to have ordinates ±$\alpha$ where $\alpha$ is a number smaller than one;
   iii) calculating the weighting function W(k) for k∈[$k_c$, $k_{nyq}$]:

$$W(k)=[M^2(k)-R^2(k)]^{-\frac{1}{2}}$$

where M(k) is the maximum modulus in the band [$k_c$, $k_{nyq}$] defined by the user;
   iv) calculating $a_i(n)$, n∈[0,N] such that:

$$I(k) = \sum_{n=0}^{n=N} a_i(n) \cos(nDx\,k)$$

corresponds to the minimum of $\max_{k \in [0,kc]}$ |I(k)–$I_0$(k)| while constraining $\max_{k \in [kc,knyq]}$ W(k)|I(k)| to be equal to one; and
   v) defining the extrapolation operator by summing the syntheses obtained in steps ii) and iv), i.e.:

$$F(k)=[R(k)+jI(k)] \exp(-j\phi_c)$$

the looked-for coefficients of the operator being:

$$a(n)=[a_r(n)+ja_i(n)] \exp(-j\phi_c).$$

17. A system according to claim 13, wherein at step i) the processor means set:

$$R_0(k_c)=1 \text{ and } I_0(k_c)=0.$$

18. A system according to claim 13, wherein at step iii) the processor means constrain the minimum of M(k) to be greater than $\alpha$ and its maximum to be less than one.

19. A system according to claim 13, wherein the processor means are adapted to:
   i) approximate a minus Laplacian $L_0(k_x,k_y)=k_x^2+k_y^2$ by the sum of two one-dimensional filters; and
   ii) approximate an extrapolation operator $F_0$ by a polynomial of the minus Laplacian $L_0$.

20. A system according to claim 19, wherein at step i) the processor means approximate the minus Laplacian by the sum of two one-dimensional filters of the form:

$$L = \sum_{n=0}^{n=N_{Lx}} d_x(n) \cos(nDx\,k_x) + \sum_{n=0}^{n=N_{Ly}} d_y(n) \cos(nDy\,k_y).$$

21. A system according to claim 19, wherein at step ii) the processor means approximate the extrapolation operator by a polynomial of the minus Laplacian of the form:

$$F_0(\omega/c, k_x, k_y) = \sum_{n=0}^{n=N} p(\omega/c, n)\, L_0^n.$$

22. A system according to claim 13, wherein to synthesize the minus Laplacian, the processor means are adapted to:

1) perform spectrum synthesis of the minus second derivative operator n $\underline{x}$, by calculating a symmetrical filter of length $2N_{Lx}+1$ with a sampling interval Dx, where the spectrum $D_x(k)$ defined by:

$$D_x(k) = \sum_{n=-N_{Lx}}^{n=N_{Lx}} d_x(n)\exp(j\, nDx\, k) \text{ with } d_x(-n) = d_x(n)$$

approximates the spectrum of the minus second derivative $D_0(k)=k^2$ over $k\in[0,\alpha_x\, k_{nyqx}]$ with $0<\alpha_x<1$ 2) performing spectrum synthesis of the minus second derivative operator in $\underline{y}$ by calculating a symmetrical filter of length $2N_{Ly}+1$ with a sampling interval Dy, whose spectrum $D_y(k)$ defined by:

$$D_y(k) = \sum_{n=-N_{Ly}}^{n=N_{Ly}} d_y(n)\exp(j\, nDy\, k) \text{ with } d_y(-n) = d_y(n)$$

approximates the spectrum of the minus second derivative $D_0(k)=k^2$ over $k\in[0,\alpha_y k_{nyqx}]$ with $0<\alpha_y<1$; and 3) defining $L(k_x,k_y)=D_x(k_x)+D_y(k_y)$ which is the spectrum synthesis of the minus Laplacian $L_0(k_x,k_y)=k_x^2+k_y^2$ over the rectangle $k_x\in[-\alpha_x k_{nyqx},\alpha_x k_{nyqx}]$, $k_y\in[-\alpha_y k_{nyqy}, \alpha_y k_{nyqy}]$.

23. A system according to claim 13, wherein the coefficients $d_x(n)$ and $d_y(n)$ of the minus Laplacian are synthesized by the processor means by using the Remez algorithm, with $S_0(h)=h^2$, $W(h)=1$ for $h\in[0,\alpha_x,\pi]$, $W(h)=\epsilon$ for $h\in[\alpha_x,\pi,\pi]$ where $\epsilon$ is a small number equal to about 0.05.

24. A system according to claim 13, wherein the polynomial of the extrapolation operator is synthesized by the processor means in the form of a spectrum synthesis.

25. A system according to claim 13, wherein the processor means form depth extrapolation with steps that consist in:
calculating the coefficients $d_x(n)$ and $d_y(n)$ of the minus Laplacian;
defining the limits $[L_{min},L_{max}]$ of the minus Laplacian; and
for each $\omega/c$ running over sampling in the range $[\omega_{min}/c_{max},\omega_{max}/c_{min}]$ calculating the coefficients $p(\omega/c,n)$ of the polynomial development of the extrapolation operator $F_0(\omega/c,L)$.

26. A system according to claim 13, wherein for depth extrapolation, the processor means are adapted to:
1) initializing $$W_{z+dz}(m_x,m_y)=p[\omega/c(m_x,m_y),N]W_z(m_x,m_y) \text{ then}$$

2) for n=N–1 to 0 doing:

$$W_{z+dz}(m_x,m_y)=(L*W_{z+dz})(m_x,m_y)+p[\omega/c(m_x,m_y),n]W_z(m_x,m_y)$$

with W'=L*W defined by $$W'(n_x, n_y) = \sum_{n=-N_{Lx}}^{n=N_{Lx}} d_x(n)\, W(n_x-n, n_y) + \sum_{n=-N_{Ly}}^{n=N_{Ly}} d_y(n)\, W(n_x, n_y-n).$$

27. A system according to claim 13, wherein the polynomial of the extrapolation operator is synthesized by the processor means on the basis of steps consisting in:
changing variable:
$L=\frac{1}{2}(L_{min}-L_{max})\cos(h)+\frac{1}{2}(L_{min}+L_{max})=g(h)$ with $L\in[L_{min},L_{max}]$, $h\in[0,\pi]$, and $F_0[g(h)]=S_0(h)$ being a known symmetrical spectrum finding t(n), $n\in[0,N]$ such that $$S(h) = \sum_{n=0}^{n=N} t(n)\cos(nh)$$

approximates to $S_0(h)$ for $H\in[0,h_c]$ and has a modulus of less than one over $[h_c,\pi]$ with $h_c=g^{-1}(L_c)$; and then defining $F(L)=S(g^{-1}(L))$.

28. A system according to claim 13, wherein the processor means write the extrapolation operator in the form:

$$F(L) = \sum_{n=0}^{n=N} t(n)\, T_n[(2L - L_{min} - L_{max})/(L_{min} - L_{max})] \quad (4)$$

where $T_n(x)$ is the Chebychev polynomial of degree $\underline{n}$ defined by $T_n(\cos h)=\cos nh$.

29. A system according to claim 13, wherein the processor means write the extrapolation operator in the form:

$$F(L) = \sum_{n=0}^{n=N} p(n)\, (AL/L_{max})^n \quad (5)$$

where A is a scale factor typically equal to 4.

30. A system according to claim 13, wherein for depth extrapolation the processor means are adapted to:
1) initializing $$W_{z+dz}(m_x,m_y)=p[\omega/c(m_x,m_y),N]W_z(m_x,m_y) \text{ then}$$

2) for n=N–1 to 0 doing:

$$W_{z+dz}(m_x,m_y)=(L*W_{z+dz})(m_x,m_y)+p[\omega/c(m_x,m_y),n]W_z(m_x,m_y)$$

with W'=L*W defined by $$W'(n_x, n_y) = \sum_{n=-N_{Lx}}^{n=N_{Lx}} [Ad_x(n)/L_{max}]\, W(n_x-n, n_y) +$$

$$\sum_{n=-N_{Ly}}^{n=N_{Ly}} [Ad_y(n)/L_{max}]\, W(n_x, n_y-n).$$

31. A system according to claim 13, wherein for depth extrapolation, the processor means are adapted to:
1) initializing:

$T_0=W_z$ $T_1=L*W_z$ $W_{z+dz}(m_x,m_y)=t[\omega/c_{z+dz}(m_x,m_y),0]T_0(m_x,m_y)+t[\omega/c_{z+dz}(m_x,m_y),1]T_1(m_x,m_y)$ 2) for n=2 to N doing:

$T=2*L*T_1-T_0$ $W_{z+dz}(m_x,m_y)=W_{z+dz}(m_x,m_y)+t[\omega/c_{z+dz}(m_x,m_y),n]T(m_x,m_y)$ $T_0=T_1$ $T_1=T$ end $\underline{n}$ loop with W'=L*W defined by $$W'(n_x, n_y) = \sum_{n=-N_{Lx}}^{n=N_{Lx}} [2d_x(n)/(L_{min} - L_{max})] W(n_x - n, n_y) +$$

$$\sum_{n=-N_{Ly}}^{n=N_{Ly}} [2d_y(n)/(L_{min} - L_{max})] W(n_x, n_y - n) -$$

$$(L_{min} + L_{max}) W(n_x, n_y)/(L_{min} - L_{max}).$$

32. A system according to claim 13, wherein the processor means are adapted to operate a time 3D extrapolation stage on the basis of the extrapolation function which is written as follows for one time extrapolation step Dt:

$$G_0(\omega, c, k_x, k_y) = \exp jDt(\omega^2 - c^2 L_0)^{1/2} \text{ with}$$

$$L_0(k_x, k_y) = k_x^2 + k_y^2$$

which time 3D extrapolation stage consists in:
tabulating the coefficients $p(\omega, c_{min}, n)$ of the polynomial development for at least one determined velocity value ($c_{min}$); and
calculating the other required coefficients $p(\omega, c, n)$ by multiplying the tabulated coefficients by $(c/c_{min})^{2n}$, i.e. $p(\omega, c, n) = (c/c_{min})^{2n} p(\omega, c_{min}, n)$.

33. A method according to claim 1, including the step of writing the extrapolation operating in the form:

$$F(L) = \sum_{n=0}^{n=N} t(n) T_n[(2L - L_{min} - L_{max})/(L_{min} - L_{max})] \quad (4)$$

where $T_n(x)$ is the Chebychev polynomial of degree n defined by $T_n(\cos h) = \cos nh$.

34. A method according to claim 1, including the step of writing the extrapolation operator in the form:

$$F(L) = \sum_{n=0}^{n=N} p(n) (AL/L_{max})^n \quad (5)$$

where A is a scale factor typically equal to 4.

35. A method according to claim 34, wherein depth extrapolation consists in:
1) initializing $$W_{z+dz}(m_x, m_y) = p[\omega/c(m_x, m_y), N] W_z(m_x, m_y) \text{ then}$$

2) for n=N−1 to 0 doing:

$$W_{z+dz}(m_x, m_y) = (L*W_{z+dz})(m_x, m_y) + p[\omega/c(m_x, m_y), n] W_z(m_x, m_y)$$

with W'=L*W defined by $$W'(n_x, n_y) = \sum_{n=-N_{Lx}}^{n=N_{Lx}} [Ad_x(n)/L_{max}] W(n_x - n, n_y) +$$

$$\sum_{n=-N_{Ly}}^{n=N_{Ly}} [Ad_y(n)/L_{max}] W(n_x, n_y - n).$$

36. A method according to claim 33, wherein depth extrapolation consists in:
1) initializing:

$$T_0 = W_z$$

$$T_1 = L*W_z$$

$$W_{z+dz}(m_x, m_y) = t[\omega/c_{z+dz}(m_x, m_y), 0] T_0(m_x, m_y) + t[\omega/c_{z+dz}(m_x, m_y), 1] T_1(m_x, m_y)$$

2) for n=2 to N doing:

$$T = 2*L*T_1 - T_0$$

$$W_{z+dz}(m_x, m_y) = W_{z+dz}(m_x, m_y) + t[\omega/c_{z+dz}(m_x, m_y), n] T(m_x, m_y)$$

$$T_0 = T_1$$

$$T_1 = T$$

end n loop
with W'=L*W defined by $$W'(n_x, n_y) = \sum_{n=-N_{Lx}}^{n=N_{Lx}} [2d_x(n)/(L_{min} - L_{max})] W(n_x - n, n_y) +$$

$$\sum_{n=-N_{Ly}}^{n=N_{Ly}} [2d_y(n)/(L_{min} - L_{max})] W(n_x, n_y - n) -$$

$$(L_{min} + L_{max}) W(n_x, n_y)/(L_{min} - L_{max}).$$

* * * * *

UNITED STATES PATENT AND TRADEMARK OFFICE
CERTIFICATE OF CORRECTION

PATENT NO. : 5,583,826
DATED : December 10, 1996
INVENTOR(S) : Soubaras It is certified that error appears in the above-identified patent and that said Letters Patent is hereby corrected as shown below:

In column 4 at line 23, please delete " $k_x^2 \ k_y^2$ " and insert -- " $k_x^2 + k_y^2$ In column 4 at line 60, please delete " $W_{\omega,z+dz}$ " and insert -- $W_{\omega,z+dz} (M_x, M_y)$ --.

In column 5 at line 24, please delete " t " and insert -- to --.

In column 8 at line 56, please delete " i) " and insert -- ii) --.

In column 14, claim 1 at line 61, please delete " $D_x(k_y)$ " and insert -- $D_x(k_x.)$ In column 19, claim 22 at line 2, please delete " n " and insert -- in --.

In column 20, claim 27 at line 8, please delete " H " and insert -- h --.

Signed and Sealed this

Twenty-ninth Day of July, 1997

Attest:

*Attesting Officer*

BRUCE LEHMAN

*Commissioner of Patents and Trademarks*